United States Patent [19]

Gendron et al.

[11] Patent Number: 5,331,153
[45] Date of Patent: Jul. 19, 1994

[54] GRAVITY ORIENTATION DEVICE HAVING AN ENCODER AND A ROTATABLE SHAFT MOUNTED IN A CYLINDRICAL CASING

[75] Inventors: Alain Gendron, Ste-Catherine; Pierre Senecal, Montréal, both of Canada

[73] Assignee: Noranda Inc., Toronto, Canada

[21] Appl. No.: 14,482

[22] Filed: Feb. 8, 1993

[30] Foreign Application Priority Data

Feb. 14, 1992 [CA] Canada .................. 2061058

[51] Int. Cl.⁵ .................................. G01D 5/34
[52] U.S. Cl. ...................... 250/231.10; 250/231.13
[58] Field of Search .............. 250/231.13, 231.14, 250/231.10; 33/391, 1 T

[56] References Cited

U.S. PATENT DOCUMENTS 4,101,882  7/1978  Kramer ................ 250/231.18
4,664,519  5/1987  Hullein et al. .......... 356/132
5,134,471  7/1992  Gendron et al. ........ 358/100

FOREIGN PATENT DOCUMENTS 2041873  2/1992  Canada .

Primary Examiner—Edward P. Westin
Assistant Examiner—T. Davenport
Attorney, Agent, or Firm—Keck, Mahin & Cate

[57] ABSTRACT

A gravity orientation device comprises a cylindrical casing, a shaft rotatably mounted in the casing along the longitudinal axis thereof and having pointed ends contacting bearing surfaces located in the ends of the casing, an encoder mounted within the casing and having a fixed portion secured to the casing and a rotary portion secured to the shaft, and a weight pendulum mounted on the shaft for rotation around the shaft under the influence of gravity.

4 Claims, 1 Drawing Sheet

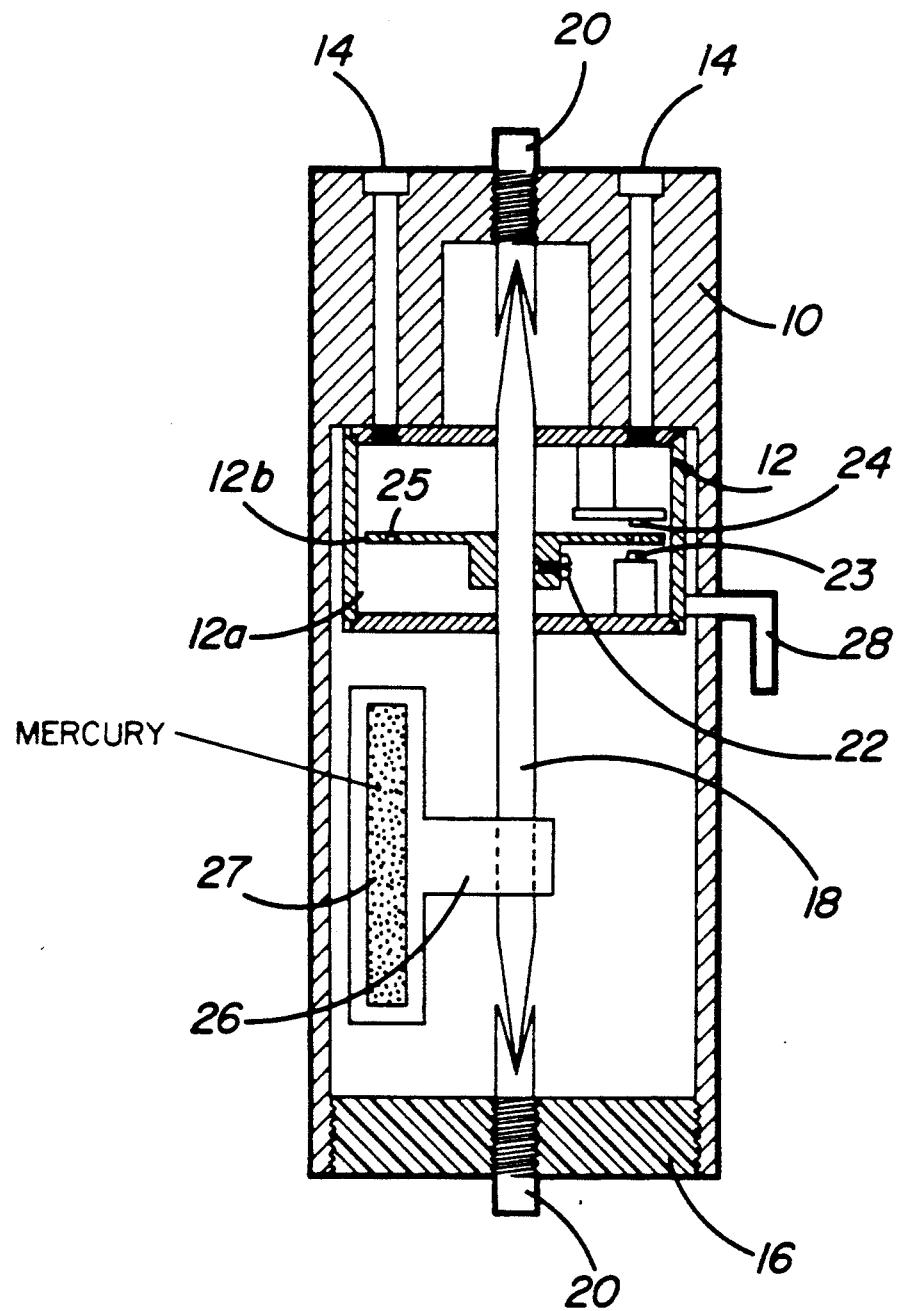

GRAVITY ORIENTATION DEVICE HAVING AN ENCODER AND A ROTATABLE SHAFT MOUNTED IN A CYLINDRICAL CASING

This invention relates to a device for monitoring the angle of rotation of a probe with respect to gravity, more particularly the angle of rotation of a probe suspended from a cable in a borehole, with respect to gravity.

Many devices such as gyroscopes, inclinometers or gravity potentiometers are used to determine the angle of rotation of a probe in a borehole. However, each of the above instruments has its own limits: an inclination angle of ±45° maximum, a maximum rotation of 350°, drifting of a few degrees with time, etc.

It is the object of the present invention to provide a simple device for monitoring the angle of rotation of a probe suspended from a cable over an angle of 360°, at a maximum angle of inclination of nearly 90° from the horizontal.

The gravity orientation device, in accordance with the present invention, comprises a cylindrical casing, a shaft rotatably mounted in such casing along the longitudinal axis of the casing and having pointed ends contacting bearing surfaces located at the ends of such casing, an encoder mounted within the casing and having a fixed portion secured to the casing and a rotary portion secured to the shaft, and a weight pendulum mounted on the shaft for rotation with the shaft under the influence of gravity.

The encoder is preferably a digital encoder capable of sending an output pulse at each half degree or less of rotation of the shaft.

The pointed ends of the shaft are preferably journalled in bearing surfaces mounted in tension screws which are adjustable to minimize friction of the shaft.

The pendulum is preferably weighted with mercury.

The invention will now be disclosed, by way of example, with reference to the accompanying drawing which illustrates a preferred embodiment of a gravity monitoring device.

Referring to the drawing, there is shown a cylindrical casing 10 which is designed to receive and hold in place an encoder 12 which is secured to one end of the casing by means of screws 14. The other end of the casing is closed by an end piece 16. A shaft 18, having both ends machined to a fine angle, is passed through the center of the encoder. The pointed ends of the shaft contact suitable bearing surfaces made of hard metal located in the ends of the casing. The bearing surfaces are preferably in the form of tension screws 20 which are adjustable to minimize friction of the shaft. The encoder is a conventional device, such as the one sold by Hewlett-Packard under Ser. No. HEDS-5310. It comprises a fixed portion 12a which is secured to the casing and a rotary portion 12b in the shape of a disc which is secured to the shaft by means of a screw 22. A light source 23 is provided inside the encoder on one side of the disc and a suitable light sensor 24 on the other side of the disc. The disc is provided with a plurality of equally spaced holes 25 through which light from the source may impinge upon the sensor during rotation of the disc. A weight pendulum 26 is secured to the shaft for rotation therewith and is sized to clear the inside wall of the casing during rotation. A few grammes of mercury 27 is placed inside the pendulum to well define the position of gravity.

The tension on the bearings is adjusted to have a minimum friction with the pointed end of the shaft so that the shaft will rotate a full 360° at a maximum angle of inclination of the longitudinal axis of the casing of nearly 90° from the horizontal.

In operation, the fixed portion 12a of the encoder determines the position of the rotary portion 12b of the encoder by sending a pulse through an output wire 28 at each 0.5° or less of rotation of the shaft. An electronic circuit board of conventional design may be used to count the pulses and convert them to degrees of rotation of the shaft.

The above orientation device has been developped for detecting any angular deviation resulting from torsion of a cable supporting a camera head assembly used in a borehole as disclosed in Canadian Patent Application No. 2,041,873 filed May 6, 1991. However, it may be used in other applications where a similar angular deviation could be measured using gravity as a reference.

We claim:

1. A gravity orientation device comprising:
   a) a cylindrical casing;
   b) a shaft rotatably mounted in said cylindrical casing along a longitudinal axis of the cylindrical casing and having pointed ends contacting bearing surfaces located in ends of said casing, the shaft rotating a full 360° at a maximum angle of inclination of the longitudinal axis of the casing of nearly 90° from horizontal;
   c) an encoder mounted within said casing and having a fixed portion secured to said casing and a rotary portion secured to said shaft; and
   d) a weight pendulum mounted on said shaft for rotation around the shaft under influence of gravity.

2. A gravity orientation device as defined in claim 1, wherein the encoder is a digital encoder capable of sending an output pulse at each half degree or less of rotation of the shaft.

3. A gravity orientation device as defined in claim 1, wherein the pointed ends of said shaft are journalled in bearing surfaces mounted in tension screws which are adjustable to minimize friction of the shaft.

4. A gravity orientation device as defined in claim 1, wherein said pendulum is weighted with mercury.

* * * * *